United States Patent [19]

Vanderpool et al.

[11] 3,947,332

[45] Mar. 30, 1976

[54] PREPARATION OF HETEROPOLY ACIDS OF TUNGSTEN AND MOLYBDENUM

[75] Inventors: Clarence D. Vanderpool; James C. Patton, Jr.; Tai K. Kim; Martin B. MacInnis, all of Towanda, Pa.

[73] Assignee: GTE Sylvania Incorporated, Stamford, Conn.

[22] Filed: June 7, 1974

[21] Appl. No.: 477,257

[52] U.S. Cl. .................. 204/86; 204/89; 204/90; 204/94; 423/307; 423/326
[51] Int. Cl.$^2$. C25B 1/22; C25B 1/24; C01G 39/00; C01G 41/00
[58] Field of Search ............ 204/86, 89, 90, 94, 92; 423/307, 326

[56] References Cited
UNITED STATES PATENTS

| | | | |
|---|---|---|---|
| 1,557,491 | 10/1925 | Codd | 204/86 |
| 2,503,991 | 4/1950 | Bechtold | 423/307 |
| 3,113,911 | 12/1963 | Jones | 204/94 |
| 3,124,520 | 3/1964 | Juda | 204/86 |
| 3,220,941 | 11/1965 | Osborne | 204/87 |
| 3,361,518 | 1/1968 | Chiola | 423/326 |
| 3,523,880 | 8/1970 | Parsi | 204/180 P |
| 3,657,104 | 4/1972 | Hodgdon | 204/301 |

*Primary Examiner*—F. C. Edmundson
*Attorney, Agent, or Firm*—Norman J. O'Malley; John C. Fox; Donald R. Castle

[57] ABSTRACT

Heteropoly acids of tungsten and molybdenum, such as tungstosilicic acid and molybdosilicic acid, are produced by first preparing an aqueous solution of an alkali metal tungstate or molybdate and an alkali metal salt of the hetero atom, and then removing the alkali metal cations from the solution by means of a cation exchange membrane under the influence of an applied electrical potential, whereby the reactive tungstate or molybdate and hetero species anions react to form the desired heteropoly acid.

5 Claims, No Drawings

PREPARATION OF HETEROPOLY ACIDS OF TUNGSTEN AND MOLYBDENUM

BACKGROUND OF THE INVENTION

This invention relates to the preparation of heteropoly acids of tungsten and molybdenum, and more specifically relates to a method for producing such heterpoly acids from alkali metal salt solutions using cation exchange membranes.

The classical method of making what is generally known as "alkali free" 12-tungstophosphoric acid is by ether extraction of an acidified mixture of sodium tungstate and sodium hydrogen phosphate. The tungstophosphoric acid ether complex may be decomposed by evaporation to crystals. This method is described in, Inorganic Synthesis, 1, pages 132–133 (1939), H. S. Booth, Ed., McGraw Hill Book Company, New York, New York. Alternatively the ether complex may be decomposed by heating with water or dilute hydrochloric acid solution, as described in ibid, 1, Page 133; J. Chem. Soc., pages 3189–3193 (August 1962); and J. Applied Chem. (London), 2, pages 262–264 (1952). The principle disadvantages of this method are the use of ether for extraction, which makes a large manufacturing process based upon it hazardous, and also the fact that yields are relatively low and the products relatively unstable. Such instability is primarily due to the presence of residual alkali metal. Various attempts have been made to remove such residual impurity, as exemplified by the use of various cation exchange resins in contact with dilute solutions of the product. See U.S. Pat. No. 2,503,991.

Another method for the preparation of heterpoly acids is described in U.S. Pat. No. 3,446,557, assigned to the assignee of the present application, in which a hydrolyzable alkali-free source of tungsten, for example a tungsten hexahalide, is hydrolyzed in an aqueous medium including an acid of the hetero atom. This technique generally requires the removal of residual mineral acid anions which lead to instability of the heteropoly acid product. A technique for the removal of mineral acid anions from the heteropoly acid product using anion exchange resins is disclosed in U.S. Pat. No. 3,361,518, assigned to the present assignee. However such removal is time consuming and expensive and the anion resin tends to hold the heteropoly acid as well as the mineral acid ions causing very low yields.

A further method for the preparation of heteropoly acids is described in U.S. Pat. No. 2,503,991, wherein an aqueous solution containing a mixture of an alkali metal salt of the desired hetero atom with an alkali metal molybdate or tungstate is contacted with a cation exchange resin thereby to remove the alkali and convert the reactive anions to the desired heteropoly acid. This technique becomes impractical in the preparation of heteropoly acids in which the hetero ion is insoluble. In the preparation of silicotungstic acid or silicomolybdic acid for instance, sodium silicate converts to silica gel when the sodium is removed and physically plugs the resin bed or column.

Another method is disclosed in U.S. Pat. No. 3,288,562 assigned to the present assignee which involves forming an aqueous solution of an alkali metal tungstate or molybdate, adjusting the pH with phosphoric acid, and contacting this solution with a cation exchange resin. Because this technique relies upon the use of cation exchange resins it is applicable only to the preparation of acids having a soluble hetero ion.

The search continues for a preparation technique for heteropoly acids of tungsten and molybdenum which has a relatively high efficiency, is broadly applicable regardless of the solubility of the hetero ion, and results in a product substantially uncontaminated with either alkali metal cations or mineral acid anions which would tend to degrade the hetero acid product.

SUMMARY OF THE INVENTION

In accordance with the invention it has been found that heteropoly acids of tungsten and molybdenum may be prepared simply and in good yield by the use of a cation exchange membrane. Aqueous solutions of alkali metal tungstate or molybdate are mixed with a soluble salt of the desired hetero atom, and the metal cations are removed from the solution by the cation exchange membrane under the driving force of an applied electrical potential. With these cations removed, the remaining tungstate or molybdate ions and the hetero ions are in a reactive state in which they rearrange to form the desired heteropoly acid.

For purposes of the invention, the term heteropoly acids includes any acid in which the anion thereof contains tungsten or molybdenum and at least one other element having a positive valence of from +2 to +7. Over 30 elements have been reported as capable of acting as the hetero atom. Heteropoly anions may be classified according to the ratio of the number of hetero atoms to the tungsten or molybdenum atom. For example, in heteropoly tungsten anions the known ratios of hetero atoms to tungsten atoms may range from 1:12 to 2:17, and the hetero atoms may include (for the 1:12 ratio) $P^{+5}$, $As^{+5}$, $Si^{+4}$, $Ge^{+4}$, $Ti^{+4}$, $Co^{+3}$, $Fe^{+3}$, $Al^{+3}$, $Cr^{+3}$, $Ga^{+3}$, $Te^{+4}$, and $B^{+3}$; (for a 1:10 ratio) $Si^{+4}$, $Pt^{+4}$; (for a 1:9 ratio) $Be^{+2}$; (for a 1:6 ratio) $Te^{+6}$, $I^{+7}$, $Ni^{+2}$, $Ga^{+3}$; (for the 2:18 ratio) $P^{+5}$, $As^{+5}$; (for the 2:17 ratio) $P^{+5}$, $As^{+5}$.

The heteropoly acids of the invention have a variety of uses including for example, chemical reagents, precipitants, ion exchangers photographic fixing agents, oxidizing agents, electroplating additives, hydrophobic agents, plastic curing and drying agents, and in other diverse applications, such as printing inks, paper cloring, nontoxic paints, and wax pigmentation. Further information on such heteropoly acids may be found in the KirkOthmer: Encyclopedia of Chemical Technology, Volume 22, second edition, John Wiley and Sons, Incorporated, (1970).

DETAILED DESCRIPTION OF THE INVENTION

The cation exchange membrane may be any membrane which is substantially impermeable to the alkali metal salt solutions of the invention, but which under the influence of an applied electrical potential will selectively remove the alkali metal cations from the solution. Such membranes are well known in the art and are described for example in U.S. Pat. Nos. 3,784,457 and 3,795,595. These membranes may have ion exchange groups or material impregnated or distributed throughout a polymeric matrix or binder, or such groups may be associated only with the outer surface of a membrane backing or re-enforcing sheet. In addition the entire membrane structure having ion exchange characteristics may be formed by molding or casting a partially polymerized ion exchange resin into a sheet. Various known anion exchange groups such as sulfonic acid group may be attached to a polymeric compound such as polystyrene resin, phenol formaldehyde resin, styrene-divinyl benzene copolymer, urea-formaldehyde resin, melamine-formaldehyde resin polyalkylene-polyamine-formaldehyde resin, etc.

In addition to these organic membranes, inorganic ion exchange membranes may also be used, and a description thereof may be found in U.S. Pat. Nos. 3,479,267 and 3,463,713.

Typically these ion exchange membranes are re-enforced by a backing sheet of a relatively inert material such as for example a porous structure of glass or ceramic or fabrics of asbestos, polyesters, polyamides, acrylics, rayons, polypropylene, and the like.

The thickness of the cation exchange membrane is not particularly critical, and will depend upon the particular operating conditions. While thicker membranes have a longer useful life, their electrical resistance increase proportionately to their thickness. In general, suitable membrane thicknesses may range from 0.5 mm. to 1.5 mm.

Typical commercially available cation exchange membranes include those available from Ionics Inc., Watertown, Massachusetts; Ionic Chemical Company, Burmingham, New Jersey and AMF Inc., New York, New York.

In the practice of the invention, the cation exchange membrane divides an electrolytic cell container into two compartments. One compartment contains an electrode of positive polarity and the other contains an electrode of negative polarity. Both electrodes should be of a relatively nonreactive or inert material with regard to the electrolytes. Suitable electrode materials include graphite, the noble metals such as gold, and platinum.

The aqueous solution of metal tungstate or molybdate and metal salt of the hetero atom is added to the positive side of the electrolytic cell. The concentration of salts in solution may vary over a considerable range up to saturation. Typical concentrations are from 10g/l to 900 g/l. The ratio of tungstate or molybdate salt to hetero atom salt is not critical to the practice of the invention. However, it may be preferred to avoid a large excess of the hetero ion over the amount required for formation of the heteropoly anion, particularly where such salt has a limited solubility in the electrolyte.

While any metal cations capable of being selectively passed by the membrane are suitable, cations of the alkali metals Li, Na, K, Rb, and Cs are preferred because their salts are soluble and commercially available. The electrical potential required to remove alkali metal cations from the aqueous salt solution will depend upon the concentration of the electrolyte, the thickenss of the cation membrane, and the geometry of the cell. However, suitable operating potentials for the membrane generally range from 5 to 80 volts. The negative side of the electrolytic cell is filled with a liquid, preferably water, having sufficient conductivity to act as an electrolyte.

EXAMPLE

An electrolytic cell is separated into positive and negative sides by placing a cation exchange membrane (number 61-AZ1066 from Ionics Inc., Watertown, Mass.) between 2 platinum electrodes each having a surface area of about 6 in.$^2$ and suspended by means of a platinum wire in the cell. The platinum wire also serves as conductive leads. An aqueous solution consisting of 78 grams of sodium tungstate dihydrate ($Na_2WO_4 \cdot 2H_2O$), 14 grams of sodium metasilicate and 400 cc of water is placed in the positive side of the cell. 400 cc of water is placed on the negative side of the cell. An initial electrical potential of 12 volts is applied across the cell. After about 2½ hours the current has increased from near 0 to about 3.5 amperes, and $SiO_2$ has begun to precipitate from the solution. After about 4½ hours about ½ of the solution from the negative side of the cell is replaced with water and the potential increased to obtain a current of about 5 amperes. After about 7½ hours the solution from the negative side is again replaced with water. After a total of about 11 hours, the pH of the solution in the positive cell has decreased from strongly basic to a value of about 0.6. The solution, which is now a silicotungstaic acid solution, is removed from the positive side and filtered to remove excess silica. The filtered solution is evaporated on a steam bath at approximately 70°C until a few crystals begin to form. The solution is then allowed to continue to crystallize by cooling. The crystals recovered were identified by x-ray and infrared analysis to be pure silicotungstic acid. Chemical analysis reveals about 85% of $WO_3$ and 1.8% of $SiO_2$, compared to theoretical values for silicotungstic acid ($SiO_2 \cdot 12WO_3 \cdot 2H_2O$) of 84.04% of $WO_3$ and 1.81% of $SiO_2$. Spectrographic analysis reveals trace impurities of the following: aluminum, calcium, iron, magnesium, molybdenum, titanium and sodium in the total amount of less than 0.5% by weight of the crystals recovered.

While there has been shown and described what are at present considered the preferred embodiments of the invention, it will be obvious to those skilled in the art that various changes and modifications may be made therein without departing from the scope of the invention as defined by the appended claims.

What is claimed is:

1. Electrolytic method for producing heteropoly acids of tungsten and molybdenum containing at least one hetero atom, comprising applying an electrical potential of from about 5 to 80 volts across a cation exchange membrane, the anodic side of which is in contact with an aqueous solution of a first metal salt selected from the group consisting of alkali metal tungstates and molybdates, and a second metal salt of a hetero atom selected from the group consisting of alkali metal salts of P, As, Si, Ge, Ti, Co, Fe, Al, Cr, Ga, Te, B, Pt, Be, I and Ni, the concentration of the first and second metal salts in solution being from about 10 to 900 grams per liter, and the polarity of the applied potential being such as to cause removal of the metal cations from the solution and the formation of a soluble heteropoly acid in the cation-depleted solution.

2. The method of claim 1 wherein the cation exchange membrane is contacted on the opposing side with water, whereby the alkali metal cations are introduced into the water to form alkali metal hydroxide.

3. The method of claim 2 wherein the alkali metal hydroxide formed is recovered and used to form additional alkali metal salt solutions.

4. The method of claim 1 wherein the heteropoly acid containing solution is filtered to remove excess solids.

5. The method of claim 4 wherein the filtered solution is evaporated to obtain crystalline heteropoly acid.

* * * * *